United States Patent Office 3,157,459
Patented Nov. 17, 1964

3,157,459
PROCESS OF ALKYLATING SHAPED, ORIENTED
LINEAR POLYMERS
Guy C. Murdoch, Wycombe, and Robert G. Minton,
Levittown, Pa., assignors to Rohm & Haas Company,
Philadelphia, Pa., a corporation of Delaware
No Drawing. Filed Apr. 11, 1961, Ser. No. 102,130
7 Claims. (Cl. 8—115.5)

The present invention is concerned with the production of artificial fibers, filaments, and films from polymerized monovinyl aromatic compounds such as styrene. The invention is particularly concerned with the production of strong and tough films, pellicles, fibers, and fabrics of this class, as will be pointed out more particularly hereinafter.

Fibers and films have been produced from polymerized styrene for various uses. However, when such fibers or films are stretched in order to increase the strength thereof, they are subject to shrinkage and loss of strength on heating and frequently on mere contact with organic solvents, even though the fiber or film is not soluble therein. This characteristic limits the usefulness of the fibers since the simple operation of pressing fabrics made therefrom with a hot iron requires extreme caution to avoid excessive heat which would cause serious shrinkage and loss of shape of the textile fabric. In household and industrial uses, this tendency to shrink on heating is a serious limitation of the fibers. The use of the fibers as bristles in brushes is quite common but here there is risk of serious damage if the user should apply the brushes to hot articles during use. The use of fabrics made from such fibers and filaments for filtration of liquids or gases is also limited in scope because of the tendency to shrink on heating. It is desirable to extend the use of such filtering media to embrace the filtration of hot liquids and gases.

In accordance with the present invention, a process is provided for modifying films, fibers, and fabrics formed of polymerized monovinylaromatic materials by which the resistance of such articles to heat and to solvents is greatly improved. Surprisingly, the process of the present invention which involves a peculiar type of cross-linking action can be applied to stretched fibers of the polymerized styrene without causing severe shrinkage or loss of strength. In fact, the most outstanding characteristic of the present invention is that the stabilization treatment increases the tenacity and frequently the toughness of the fibrous articles. By "toughness" is meant the arithmetic product of the elongation and tenacity.

The fibers or films of polymerized monovinyl aromatic compounds that are adaptable to treatment in accordance with the present invention are those which contain a substantial amount of a linear polymerization product of a linear aliphatic polyene. The monovinyl aromatic compound may be copolymerized with the linear aliphatic polyene monomer and, if the fibers or films are formed exclusively from such a copolymer, the copolymer should be such that it has an apparent second order transition temperature, herein designated "$T_i$," which is at least about 20° C. and may be as high as 100° C. or more. Depending upon the particular polyene present in the copolymer, the minimum amount of monovinyl aromatic compound required to provide the $T_i$ of at least 20° C. may vary. In general, however, the copolymers contain from 50 to 95% by weight of a monovinyl aromatic compound.

The $T_i$ value referred to is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The fiber or film may also be formed of a blend of a homopolymer of monovinyl aromatic compound with a linear homopolymer of a linear aliphatic polyene. A blend with natural or synthetic rubbers may be used. The fiber or film may comprise (1) a copolymer of one or more monovinyl aromatic compounds or a copolymer of one or more vinyl aromatic compounds with one or more linear aliphatic polyenes, and (2) a linear homopolymer or copolymer of a linear aliphatic polyene with or without other comonomers which may include one or more monovinyl aromatic compounds of the same or different species or type present in the first-mentioned polymer. In this type of blended polymer fiber or film, the apparent second order transition temperature, $T_i$, of the blend should be at least about 20° C. and may be as high as 100° C. or higher.

In general, the process of the present invention is applicable to fibers or films in which the proportion of linear aliphatic polyene compound in the copolymer or blend is at least 1% by weight of the copolymer or of the blend. The invention is especially valuable with fibers or films formed from polymers in which the proportion of the polyene is from 10 to 40% by weight of the polymerized mass, whether a copolymer or blend makes up the fiber or film.

The monovinyl aromatic compound, which may also be termed a "mono-alkenyl aromatic compound," may be any of those having the formula $$H_2C=C(R)Z$$

wherein R is hydrogen or an alkyl group advantageously of less than 3 carbon atoms and Z is an aryl group which has positions on an aromatic nucleus available for substitution. The formula includes vinyl aryls, such as styrene, vinyl naphthalene, vinyl diphenyl, vinyl fluorene, etc., and their nuclear-substituted derivatives such as alkyl, aryl, alkaryl, aralkyl, cycloalkyl, alkoxy, aryloxy, chloro, fluoro, chloromethyl, fluoromethyl, and trifluoromethyl nuclear derivatives, for example, methyl-styrene, e.g., o-, m-, and p-methyl-styrenes, dimethyl-styrenes, o-, m-, and p-ethyl-styrenes, isopropyl-styrenes, tolyl-styrenes, benzyl-styrenes, cyclohexyl-styrenes, methoxy-styrenes, phenoxy-styrenes, o-, m-, and p-chloro-styrenes, o-, m-, and p-fluorostyrenes, chloro-methyl-styrenes, fluoromethyl-styrenes, trifluoromethyl-styrenes, vinyl-methyl-naphthalenes, vinyl-ethyl-naphthalenes, vinyl-chloro-naphthalenes, vinyl-methyl-chloro-naphthalenes, etc. The polymerizable monomers which can be used advantageously with ionic type catalysts include aromatic compounds having a vinyl group containing an alkyl group in its alpha position, e.g., isopropenyl or alpha-methyl-vinyl, alpha-ethyl-vinyl, alpha-propylvinyl, etc. Such alpha-alkyl-vinyl groups may be substituted on benzene, naphthalene, diphenyl, fluorene nuclei, etc., and may have other substituents on the aromatic nuclei as illustrated above for the vinyl aryl compounds.

Examples of linear aliphatic polyenes which may form parts of the copolymer or of homopolymers or copolymers in blends are butadiene-1,3; isoprene or 2-methyl-butadiene-1,3; 2,3-dimethyl-butadiene - 1,3; 2 - methyl-pentadiene-1,3; hexatriene-1,3,5; myrcene; ocimene; allo-ocimene; etc., and certain substituted aliphatic polyenes such as chloro, fluoro, and aryl derivatives, e.g., chloroprene or 2 - chlorobutadiene-1,3; fluoroprene or 2-fluoro-butadiene-1,3; and 1-phenyl-butadiene-1,3.

The present invention is not concerned with the steps employed in preparing the fibers or films since they have been formed from such polymeric materials heretofore and, in their making, fibers have been stretched to orient the polymer molecules longitudinally with respect to the axis of the fiber and films have also been stretched or rolled to orient the polymer molecules lengthwise or widthwise or some in both direction. Such stretching may be form 10% to several thousand percent of the original length of the fiber, or of either or both the length and width of the film, as obtained by known spinning processes. It is with the stretched, oriented fibers or films that the process of the present invention is concerned.

In accordance with the present invention, it has been found that the copolymers and polymer blends in the fibers or films so far described can be cross-linked by means of hydrogen fluoride with or without boron trifluoride as an alkylation catalyst. The reaction is believed to involve the alkylation of the aromatic nuclei with the unsaturated portion of the linear polymer of the polyene and possibly also alkylation of non-aromatic portions of the polymer system, whether derived from the vinylaromatic hydrocarbon or from the polyene. However, it is not intended to be limited to any particular theory of operation.

In accomplishing the stabilization treatment, the hydrogen fluoride may be used in liquid condition at temperatures of about 20° C. or lower. Treatment may vary from a time of 1 to 10 minutes or more. Generally 5 minutes' treatment at a temperature of about 18° C. adequately stabilizes the fabric or fibers against shrinkage even on heating up to 180° C. or higher. There is no need to hold the film, fibers or fabric under tension even though the fibers therein are oriented by stretching. Surprisingly, the treatment can be effected without loss of orientation even without holding the fibers or film under tension. This is quite unusual as the application of other types of agents which crosslink by alkylation generally results in shrinkage unless the fibers or films are held under tension. It has also been surprisingly found that the tensile strength of the films, fibers, or fabric is substantially increased by the treatment.

The hydrogen fluoride may be modified by the incorporation of boron trifluoride up to saturation. The use of $1/10$ to 5 mole percent or more of boron trifluoride is beneficial to the alkylation treatment and does not require the film or fibers to be held under tension during the treatment. The use of boron trifluoride alone is not effective to crosslink the fiber or film.

Normally it is preferred to use the liquid hydrogen fluoride at temperatures below its boiling point such as about 20° C. or less. However, instead of employing the liquid hydrogen fluoride at normal pressures and under conditions just mentioned, the treatment may be effected in a pressure vessel at pressures up to 1000 pounds per square inch and at elevated temperatures below the boiling point of the hydrogen fluoride at the pressure used. The use of the pressure allows higher temperatures to be employed such as up to 80° C. or more while still using the reagent in liquid condition. This accelerates the rate of reaction so that a period of less than 1 minute may in some cases be adequate for the purposes of rendering the fibers or fabrics resistant to shrinkage at a temperatutre of about 90° C. up to 200° C. or higher.

If desired, the hydrogen fluoride may be used is gaseous condition, again with or without a substantial amount of boron trifluoride up to about 5 or 10 mole percent of the latter. Treatment with the gaseous material may be effected up to about 80° C. or higher, and the time may vary from half a minute to 5 minutes or more, depending upon the temperature, pressure, and the extent of stabilization desired.

An advantage of the treatment using hydrogen fluoride with or without small amounts of boron trifluoride is the fact that the film, fibers, or fabric may be allowed to stand in the reagent medium without being held under tension without suffering a disorientation or loss in strength. In contrast with this, the fibers or film could not be allowed to stand in aluminum chloride alkylating solutions without suffering excessive damage because of disorientation and eventual degradation.

At the completion of the treatment, the films, fibers, or fabrics are removed from the gaseous medium or the hydrogen fluoride is removed by evaporation. This evaporation may be effected by simply exposing the wet fibers or fabric to normal room temperatures or it may be effected by drying at elevated temperatures such as 140° F. or so. If desired, the film, fibers, or filaments may also be washed with an alcohol, such as methanol, to remove any mild discoloration that may be present. While the film, fibers, or fabrics still contain an appreciable amount of hydrogen fluoride they should not be treated by water. However, after the hydrogen fluoride has been removed by volatilization, the film, fibers, or fabrics may be rinsed with water, alcohols or alkaline solutions including sodium hypochlorite.

The intensity and duration of treatment may be preselected to render the film, fibers, or fabrics resistant to shrinkage at any predetermined temperature from about 90° C. (a common scouring temperature) to 200° C. or even higher. Such treatment also renders the film, fibers, and fabrics resistant to dry-cleaning solvents. After the treatment which cross-links the molecules in stretched fibers or films, the latter retains at least 75% of its orientation when treated with solvents. In the preferred embodiments, the treatment is sufficiently extensive to render the film or fiber completely insoluble.

Termination of the alkylation treatment may be effected by volatilization of the catalyst solution in a stream of dry air or nitrogen followed by immersion in water, methanol or an alkaline solution. The crosslinking reaction is self-terminating and after the maximum crosslinking obtainable with a given catalyst solution is reached no further changes occur on prolonged standing in the catalyst solution.

The stabilization treatment may be applied to films, pellicles, loose fibers, filamentary bundles such as tows, yarns, plied structures such as threads, felt-like masses which may be termed non-woven fabrics, as well as fabrics of woven, knitted, netted, knotted, braided, or otherwise formed textile or industrial fabrics. The treating liquid may be applied by spraying thereof upon the fabric or by suitably immersing the fabric or filamentary structure in the liquid. Slashers or textile pads may be employed.

The stabilized films, fibers or fabrics are far more versatile in utility than the uncross-linked polystyrene or related fibers. For example, the fibers and fabrics are adapted to be used in textiles, such as for automobile seat covers, dresses, curtains, and draperies, and are adapted to be subjected to heat, as during ironing and laundering without undergoing shrinkage. The products not only resist shrinkage under heat, but they are in general stronger and tougher than the films and fibers from which they are made. The fibers can be employed in the making of all sorts of industrial fabrics, felted, woven, or otherwise formed, and are particularly adapted to heavy-duty filtration of all sorts of gases and liquors even at elevated temperatures. The films, fibers and fabrics are also adapted to be converted, as by sulfonation or by haloalkylation and amination into ion-exchange materials adapted to be employed for a wide variety of uses, the pile or tufted type of fabric being particularly useful in this connection. The films thus obtained are of outstanding strength and are highly useful as ion-exchange membranes.

In the examples, which are illustrative of the present invention, the parts and percentages are by weight unless otherwise indicated.

The following Example A is a typical procedure by which stretched fibers of a polymer blend adapted to be converted into the stabilized products of the present invention can be made. Films are made in similar fashion using an extrusion device having an elongated slit instead of a spinneret.

EXAMPLE A

Two emulsion polymers are prepared in aqueous dispersions, using 3% potassium laurate based on solids in each case, the first being polystyrene and the second polybutadiene, both at 40% polymer solids by weight. The two dispersions are blended in an 85:15 styrene-to-butadiene-weight ratio and 5% toluene based on polystyrene solids is gradually added with stirring. The dispersion blend is forced through a platinum-alloy spinneret into a coagulating bath. The spinneret has a face diameter of 0.5 inch and contains 100 holes each of 0.0025 inch diameter. The coagulating bath is an aqueous 30% hydrochloric acid solution also containing 0.5% p-diisobutylphenoxyethoxyethyl dimethyl benzyl ammonium chloride and is maintained at 85° C. The bundle of filaments formed is drawn through the bath at a rate of about eleven meters per minute. The immersion path is four inches. The yarn is washed on a roll immersed in a trough fed by fresh water and equipped with an overflow pipe. The yarn is then dried by passing it over two canted heated drums revolving at a speed providing a linear peripheral rate of about 11 meters per minute. The temperature of the drums is 230° C. The yarn is then passed over rolls operating at differential speeds to stretch the yarn about 500%. The first of these two rolls is heated to about 120° C. The stretched yarn is collected on a bobbin winder. It has a denier of about 200, a tenacity of 0.9 gram per denier, and an extensibility of 25% at break.

EXAMPLE 1

(a) A skein of a yarn formed of continuous filaments (200 denier, 100 filaments) of a blend of 85 parts of polystyrene and 15 parts of polybutadiene which had been stretched about 500% during manufacture (such as obtained by Example A) is immersed in hydrogen fluoride at 15° C. for 10 minutes in a reaction vessel formed of polyethylene. The treated skein is removed from the liquid and subjected to a stream of warm dry air at about 30° C. to volatilize the residual hydrogen fluoride. It is then rinsed in water and dried by exposure to the ambient atmosphere. The resulting yarn is insoluble in organic solvents so that it is dry-cleanable. It also undergoes less than 4% shrinkage at temperatures up to and including 115° C. so that it can be scoured without excessive shrinkage. As a result of the treatment, the tenacity is increased by about 50% and the toughness is increased by about 50%.

(b) A skein of yarn formed of continuous filaments (1300 denier, 500 filaments) of a blend of 75 parts poly(vinyl toluene) and 25 parts of poly(chloroprene), the filaments of which had been stretched 500% during manufacture, is treated by the process of part (a) with the same results.

EXAMPLE 2

A fabric woven of 1000-denier yarns (500 filaments) having their filaments formed of a blend of 80 parts of polystyrene and 20 parts of polybutadiene which yarns had been stretched about 400% during manufacture is treated in the same way as in Example 1 with similar results. The fabric is resistant to scouring and dry-cleaning.

EXAMPLE 3

(a) A yarn formed of continuous filaments (400 denier, 120 filaments) of a copolymer of 90 parts of styrene and 10 parts of isoprene is wound on a perforated bobbin of polychlorotrifluoroethylene and then immersed in hydrogen fluoride containing about 5 mole percent of boron trifluoride at 18° C. After sweeping the reaction vessel with $BF_3$, it is closed and held at 10° C. for one-half hour. The treated package is then removed, swept with nitrogen to volatilize residual reactant, rinsed with water, and air-dried. The resulting yarn is insoluble in organic solvents so that it is dry-cleanable. It also is resistant to shrinkage at temperatures up to and including 100° C. so that it can be scoured without excessive shrinkage. As a result of the treatment, the tenacity is increased by about 50% and the toughness is increased by about 50%.

(b) A skein of yarn (300 denier, 100 filaments) formed of continuous filaments of a blend of 80 parts poly($\alpha$-methylstyrene) and 20 parts of poly(butadiene), which had been spun from a nonaqueous dispersion, fused and stretched 500%, is treated by the process of part (a) with similar results.

(c) A yarn formed of continuous filaments (1300 denier, 400 filaments) of a blend of 95 parts of poly-($\alpha$-vinyl naphthalene) and 5 parts of poly(butadiene), the filaments of which had been stretched 700% during manufacture, is treated by the method of part (a). The resulting yarn is insoluble in organic solvents and shows substantially reduced shrinkage when heated to 200° C.

EXAMPLE 4

A fabric woven of continuous filament yarns formed of a blend of 75 parts of polystyrene and 25 parts of natural rubber, the filaments of which had been stretched 600% during manufacture, is treated by the process of Example 1. The filaments in the fabric are cross-linked so that the latter is insoluble in organic solvents and is stabilized against shrinkage on laundering and dry-cleaning.

EXAMPLE 5

(a) A skein of the same constitution as in Example 1 is treated by the process of Example 1. The dried yarn is insoluble in organic solvents and is knitted to form a tubular fabric. The resulting fabric is resistant to shrinkage during normal scouring operations at temperatures of 90° to 100° C.

(b) A similarly treated yarn of the same constitution is used to form the pile of a pile fabric, the backing of which consists of a woven glass fabric.

EXAMPLE 6

100 parts of a yarn (1500 denier/450 filaments) composed of 60% poly(styrene) and 40% poly(butadiene) which has been stretched 500% to give at least partial orientation is placed in a small polyethylene reactor. A quantity of liquid anhydrous HF which has been saturated with $BF_3$ sufficient to cover the fiber is added and the air is swept out with a small amount of $BF_3$. The reactor is then closed off and a $BF_3$ gauge pressure of two p.s.i. is maintained in the reactor. The reactor is cooled to 0° C. and maintained under these conditions for three hours. At the end of the three hour period the HF-$BF_3$ mixture is drained from the fiber. A stream of dry nitrogen is then passed through the reactor to remove the majority of the remaining catalyst. The fiber is then removed from the reactor and soaked in dilute sodium bicarbonate solution for thirty minutes, washed with running water and finally washed with ethanol, methanol or isopropanol to remove some of the color and facilitate drying. The tenacity, elongation at break, and swelling ratio (swollen weight/dry weight) in toluene at 30° C. were determined after drying. The crosslinking of other poly(styrene)-poly(butadiene) blend compositions was carried out in the same manner. The results are presented in the accompanying table. In each case the toluene extractables were nil.

*Table I*

TYPICAL PROPERTIES OF HF-BF₃ CROSSLINKED FIBERS

| Fiber Composition, Styrene/butadiene, percent | State | Tenacity (g./d.) | Elongation, percent | Swelling ratio (S.R.) (toluene) |
|---|---|---|---|---|
| 80/20 | Orig | 0.9 | 50 | Dissolves. |
|  | X-linked | 1.3 | 50 | 2.0. |
| 70/30 | Orig | 0.6 | 48 | Dissolves. |
|  | X-linked | 0.8 | 11 | 1.8. |
| 60/40 | Orig | 0.6 | 28 | Dissolves. |
|  | X-linked | 0.9 | 9 | 1.5. |

EXAMPLE 7

(a) 75 parts of a fiber composed of 80% poly(styrene) and 20% poly(butadiene) is placed in a polyethylene reaction tube and sufficient anhydrous hydrofluoric acid is added to completely cover the sample with liquid. After five minutes at room temperature the liquid was poured off and the volatile hydrofluoric acid is, removed in a stream of dry nitrogen. The fiber is then washed with dilute sodium bicarbonate solution and finally with clear water and dried. The tenacity, elongation at break, and swelling ratio (S.R.) in toluene at 30° C. were determined. Typical properties of this fiber and others treated for different periods and at different temperatures are shown in the accompanying table. In each case the toluene extractable were less than 1%.

(b) The use of poly(p-chlorostyrene) in the fibers as the monovinyl aromatic component of the fiber treated by the process of part (a) gives substantially similar results.

*Table II*

TYPICAL PROPERTIES OF LIQUID HF CROSSLINKED FIBERS

| Fiber composition, Styrene/butadiene, percent | State | Reaction time (min.) | Reaction temp. (°C.) | Tenacity, g./d. | Elongation, percent | S.R. |
|---|---|---|---|---|---|---|
| 80/20 | Orig | 0 |  | 0.9 | 50 |  |
|  | X-linked | 5 | 23 | 1.3 | 50 | 2.5 |
|  | do | 10 | 23 | 1.3 | 50 | 2.5 |
|  | do | 480 | 23 | 1.3 | 50 | 2.5 |
| 80/20 | X-linked | 10 | 65 | 1.3 | 50 | 2.5 |
| 80/20 | do | 5 | 0 | 1.3 | 50 | 2.5 |
| 85/15 | Orig | 0 |  | .68 | 27 |  |
|  | X-linked | 480 | 24 | .74 | 27 | 3.4 |
| 90/10 | Orig | 0 |  | .74 | 10.2 |  |
|  | X-linked | 480 | 24 | 0.9 | 11 | 3.6 |

EXAMPLE 8

50 parts of fiber composed of 80% poly(styrene) and 20% poly(isoprene) is placed in a Kel-F tube on a vacuum manifold and the tube is evacuated. Anhydrous hydrofluoric acid is then admitted at a gauge pressure of 3 p.s.i. and allowed to stand at room temperature for the indicated reaction time. At the end of the indicated reaction time the gaseous hydrofluoric acid is pumped off and after 5 minutes at full vacuum the tube is flushed with nitrogen and the fiber removed. The fiber is washed with dilute bicarbonate, then water and dried. Typical properties determined for the fibers produced at varying reaction times are tabulated in the accompanying table.

*Table III*

TYPICAL PROPERTIES OF FIBERS CROSSLINKED WITH GASEOUS HF

| Fiber composition, Styrene/butadiene | State | Reaction time (min.) | Tenacity, g./d. | Elong., percent | S.R. (toluene) | Extractables, percent |
|---|---|---|---|---|---|---|
| 80/20 | Orig | 0 | 0.9 | 50 | Dissolves |  |
| 80/20 | X-linked | 1,380 | 1.3 | 50 | 2.5 | 2 |
| 80/20 | do | 70 | 1.2 | 50 | 2.5 | 6 |
| 80/20 | do | 5 | 1.2 | 50 | 2.6 | 11 |

The crosslinked filaments are useful as a polymeric absorbent for the separation of miscible organic liquids in accordance with the process disclosed in U.S. Patent 2,974,178, March 7, 1961. The material may be used in the form of a tow column as described in U.S. Patent 2,974,101. The fibrous material has the advantage of a high surface to volume ratio, i.e., at least 10 times that of commercial bead polymers, which gives a much greater rate of equilibration and allows a faster rate of throughput with more efficient operation. Examples of this use are the following:

EXAMPLE 9

A tow of benzene-extracted 80/20 styrene-butadiene filaments with a weight of 4.5 grams and a length of 35 centimeters was hung vertically over a receiver. The tow was wetted with pentane applied at a rate of 0.5 ml. per minute, a total of 10 cc. being used to completely wet the column. A solution of 2 ml. of pyridine and 18 ml. of isooctane was then applied to the column at a rate of 0.5 ml. per minute and eluted with pentane at the rate of 0.5 ml./min. The effluent composition was followed by gas chromatography, the isooctane being eluted in the first twenty cc. of effluent while the major portion of the pyridine was eluted in the 40th to 60th cc. of effluent. The same separation with an equal weight of beads is accomplished only at flow rates of 0.05 cc. per minute.

EXAMPLE 10

One gram of the 80/20 styrene-butadiene fiber was placed in a small Erlenmeyer flask containing 4 ml. of a 40 parts ethylene dichloride and 60 parts isooctane solution. A series of such experiments was set up. Each successive flask was sampled at a 1 minute interval for the composition of the supernatant liquid. Equilibrium is reached between the 5th and 6th minute with the supernatant liquid being 20 parts ethylene dichloride and 80 parts isooctane.

A similar experiment utilizing 30–70 mesh polystyrene beads with a 5% divinylbenzene content came to equilibrium after 60 minutes. The supernatant liquid had a composition of 17.5 parts ethylene dichloride and 82.5 parts isooctane.

We claim:

1. In the process of treating a shaped product having at least one small dimension and formed of linear polymer molecules at least partially oriented longitudinally of at least one long dimension of the product, at least part thereof being formed of at least one monovinyl aromatic compound and at least part thereof being formed of at least one linear aliphatic polyene monomer, the polymeric mass of which product is formed having an apparent second order transition temperature of at least 20° C., with an alkylation catalyst under conditions including temperature at which aromatic nuclei of the polymeric mass are alkylated by polymerized units of the polyene, the treatment being carried out for a sufficient time to render the product resistant to solvents, the improvement consisting of using an alkylation catalyst selected from the group consisting of HF and mixtures of HF and BF₃.

2. A process as defined in claim 1 in which the product is a film.

3. A process as defined in claim 1 in which the product is a fiber.

4. In the process of treating a fibrous product comprising a fiber formed of linear polymer molecules at least partially oriented longitudinally of the axis of the fiber, at least part thereof being formed of at least one monovinyl aromatic compound and at least part thereof being formed of at least one linear aliphatic polyene monomer, the polymeric mass of which the fiber is formed having an apparent second order transition temperature of at least 20° C., with an alkylation catalyst under conditions including temperature at which aromatic nuclei of the polymeric mass are alkylated by polymerized units of the polyene, the treatment being carried out for a sufficient time to substantially eliminate the shrinkage of the fibrous product on heating to a temperature of 90° C., the improvement consisting of using an alkylation catalyst selected from the group consisting of HF and mixtures of HF and $BF_3$.

5. A process as defined in claim 4 in which the catalyst is liquid HF and the temperature is from 0° to 20° C.

6. A process according to claim 5 in which the monovinyl aromatic compound is styrene.

7. A process according to claim 5 wherein the monovinyl aromatic compound is styrene and the polyene is butadiene.

References Cited in the file of this patent

UNITED STATES PATENTS

| | | |
|---|---|---|
| 2,529,316 | Smyers et al. | Nov. 7, 1950 |
| 2,677,674 | Daly | May 4, 1954 |
| 2,836,584 | Wheelock et al. | May 27, 1958 |
| 2,839,517 | Cohen et al. | June 17, 1958 |
| 2,869,973 | Hubbard et al. | Jan. 20, 1959 |
| 2,945,836 | Salyer et al. | July 19, 1960 |
| 3,111,359 | Fang | Nov. 19, 1963 |
| 3,111,360 | Fang | Nov. 19, 1963 |
| 3,111,362 | Fang et al. | Nov. 19, 1963 |

FOREIGN PATENTS

| | | |
|---|---|---|
| 794,153 | Great Britain | Apr. 30, 1958 |

OTHER REFERENCES

Chem. Abs., vol. 53, page 4204f.